(12) United States Patent
Frenkel et al.

(10) Patent No.: US 10,061,817 B1
(45) Date of Patent: Aug. 28, 2018

(54) SOCIAL RANKING FOR APPS

(71) Applicant: Google Inc., Mountain View, CA (US)

(72) Inventors: Benjamin Frenkel, Santa Clara, CA (US); Duncan John Curtis, Castro Valley, CA (US)

(73) Assignee: Google LLC, Mountain View, CA (US)

( * ) Notice: Subject to any disclaimer, the term of this patent is extended or adjusted under 35 U.S.C. 154(b) by 344 days.

(21) Appl. No.: 14/812,377

(22) Filed: Jul. 29, 2015

(51) Int. Cl.
- G06F 17/30 (2006.01)
- H04L 29/08 (2006.01)
- H04L 12/58 (2006.01)

(52) U.S. Cl.
CPC .... G06F 17/3053 (2013.01); G06F 17/30554 (2013.01); H04L 51/32 (2013.01); H04L 67/02 (2013.01)

(58) Field of Classification Search
CPC ............. G06F 17/30864; G06F 17/30867
USPC ............................................. 707/728
See application file for complete search history.

(56) References Cited

U.S. PATENT DOCUMENTS

| | | |
|---|---|---|
| 6,285,999 B1 | 9/2001 | Page |
| 7,437,351 B2 | 10/2008 | Page |
| 7,499,919 B2 | 3/2009 | Meyerzon et al. |
| 8,095,545 B2 | 1/2012 | Telloli et al. |
| 8,122,013 B1 | 2/2012 | Qian et al. |
| 8,151,217 B2 | 4/2012 | Lin |
| 8,484,199 B1 | 7/2013 | Katragadda et al. |
| 8,495,058 B2 | 7/2013 | Kulick et al. |
| 8,645,390 B1 | 2/2014 | Oztekin et al. |
| 8,745,041 B1 | 6/2014 | Katragadda et al. |
| 2006/0004713 A1 | 1/2006 | Korte et al. |
| 2006/0143236 A1 | 6/2006 | Wu |
| 2006/0282856 A1 | 12/2006 | Errico et al. |
| 2008/0077574 A1 | 3/2008 | Gross |
| 2009/0055385 A1 | 2/2009 | Jeon et al. |
| 2010/0094853 A1 | 4/2010 | Telloli et al. |
| 2011/0055238 A1 | 3/2011 | Slaney et al. |

(Continued)

FOREIGN PATENT DOCUMENTS

| | | |
|---|---|---|
| EP | 2228739 A2 | 9/2010 |
| EP | 2249261 A1 | 11/2010 |
| WO | 2008132240 A1 | 11/2008 |

OTHER PUBLICATIONS

"Appsfire rolls out a "PageRank for apps" to help separate the wheat from the chaff", TNW, http://tnw.to/1ES1n, May 17, 2012, pp. 1-5.

(Continued)

Primary Examiner — Shahid Alam
(74) Attorney, Agent, or Firm — Shumaker & Sieffert, P.A.

(57) ABSTRACT

According to an implementation, an application distribution system may receive a search query from a user and generate indicators of a set of applications based on the search query. The system may determine an influence rating for an entity that provided social media posts associated with one of the applications. The system may determine a sentiment rating for the content of the posts and determine a reliability rating for the entity. The reliability rating may be based the number of posts and the number of the entity's social media relationships. The system may determine an application rating for the application based on the influence rating, the sentiment rating, and the reliability rating. The system may rank the application within a list of the set of applications based on the application rating and provide the list to the device associated with the user.

20 Claims, 6 Drawing Sheets

(56) References Cited

U.S. PATENT DOCUMENTS

| | | |
|---|---|---|
| 2011/0196855 A1 | 8/2011 | Wable et al. |
| 2011/0231383 A1 | 9/2011 | Smyth et al. |
| 2012/0072283 A1 | 3/2012 | Devore et al. |
| 2012/0089598 A1 | 4/2012 | Oztekin et al. |
| 2012/0130996 A1 | 5/2012 | Risvik et al. |
| 2013/0054591 A1 | 2/2013 | Park et al. |
| 2014/0143222 A1 | 5/2014 | Jain et al. |
| 2014/0188839 A1 | 7/2014 | Nielsen et al. |
| 2014/0280079 A1 | 9/2014 | Jain et al. |

OTHER PUBLICATIONS

Lunden, "Relcy Is Building a PageRank-Style Mobile App Search Engine With $9M From Khosla and Sequoia", Techcrunch posted Jul. 17, 2014 http://techcrunch.com/2014/07/17/relcy-mobile-search/.

Smyth, et al., "Google Shared. A Case-Study in Social Search", UMAP 2009, LNCS 5535, pp. 283-294, 2009.

SOCIAL RANKING FOR APPS

BACKGROUND

Online searching techniques, such as web page searching, generally employ a methodology that ranks a particular web page based on the number of links between the particular page and other pages, with more links to the particular web page resulting in a higher rank for the webpage in a search result. However, in the mobile environment, when a user issues a search for a mobile application, no similar methodology is available. Applications do not typically link to other applications, nor are such links usually an indicator of relevancy. Application ranking techniques have been developed that take into consideration the sentiment expressed by users on social media. For example, mentions of a particular application on social media may be used to determine the relevancy of the application when ranking search results. However, it may be possible to manipulate this information, such as by creating social media accounts that post large amounts of positive content about an application.

BRIEF SUMMARY

According to an implementation, an application distribution system may receive a search query from a device associated with a user and generate indicators of a plurality of applications based on the search query. The system may determine a sentiment rating for a content of each of one or more first social media posts associated with a first application of the plurality of applications, and determine a reliability rating for a first entity that provided the one or more first social media posts. The reliability rating may be based on a quantity of the one or more first social media posts and a quantity of social media relationships of the first entity. The system may determine an application rating for the first application based on the sentiment rating and the reliability rating. The system may rank the first application within a list of the plurality of applications based on the application rating and provide the list to the device associated with the user.

According to an implementation, an application distribution system may receive a search query from a device associated with a user and generate a plurality of applications based on the search query. The system may determine a first sentiment rating for content of a first social media post that was provided by a first entity and that is associated with a first application of the plurality of applications. The system may determine a second sentiment rating for a content of a second social media post that was provided by the first entity and that is associated with a second application different from the first application. The system may determine a reliability rating for a first entity based on the second sentiment rating, and determine an application rating for the first application based on the first sentiment rating and the reliability rating. The system may rank the first application within a list of the plurality of applications based on the application rating and provide the list to the device associated with the user.

According to an implementation, an application distribution system may receive a search query from a device associated with a user and generate indicators of a plurality of applications based on the search query. The system may determine a first sentiment rating for content of a first social media post that was provided by a first entity and that is associated with a first application of the plurality of applications. The system may determine a second sentiment rating for a content of a second social media post that was provided by the first entity and that is associated with a second application different from the first application. The system may determine a reliability rating for the first entity based on the second sentiment rating and a quantity of distribution of the second application, and determine an application rating for the first application based on the first sentiment rating and the reliability rating. The system may rank the first application within a list of the plurality of applications based on the application rating and provide the list to the device associated with the user.

According to an implementation, the disclosed subject matter may include a means for receiving, at an application distribution system, a search query from a device associated with a user and generating indicators of a plurality of applications based on the search query. The disclosed subject matter may include a means for determining a sentiment rating for a content of each of one or more first social media posts associated with a first application of the plurality of applications, and determining a reliability rating for a first entity that provided the one or more first social media posts. The reliability rating may be based on a quantity of the one or more first social media posts, and a quantity of social media relationships of the first entity. The disclosed subject matter may include a means for determining an application rating for the first application based on the sentiment rating and the reliability rating, and ranking the first application within a list of the plurality of applications based on the application rating. The disclosed subject matter may include a means for providing the list to the device associated with the user.

Additional features, advantages, and embodiments of the disclosed subject matter may be apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide further understanding of the disclosed subject matter, are incorporated in and constitute a part of this specification. The drawings also illustrate embodiments of the disclosed subject matter, and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

To address the issues previously discussed, techniques as described herein may analyze the content of social media posts about mobile applications in order to rate the reliability of the authors of the posts. This reliability rating can indicate whether the poster's opinion was sincere and valuable, or uninformed, "spammy," or otherwise unreliable. The reliability rating may be combined with other factors into an overall application rating. The application rating may be used to rank a set of applications generated from a search query and thereby provide a more relevant list of search results to a user. For example an application rating may be determined by the following formula:

[Sentiment rating]*[Influence rating]*[Reliability rating]=[Application rating]

An application rating may be determined for each application generated in the search query and each application may be ranked in accordance with its application rating. For example, a list of game applications may have the following ranking:

| Rank: | Application indicator: | Application rating: |
|---|---|---|
| 1 | Bowmaster XLV | 2.2 |
| 2 | Endeavor Forever | 0.07 |
| 3 | Warlock Empire | 0.06 |
| 4 | Stone Cutter's Quest | −0.05 |
| 5 | Undertaken & Forsaken | −1.2 |

Figure 1:
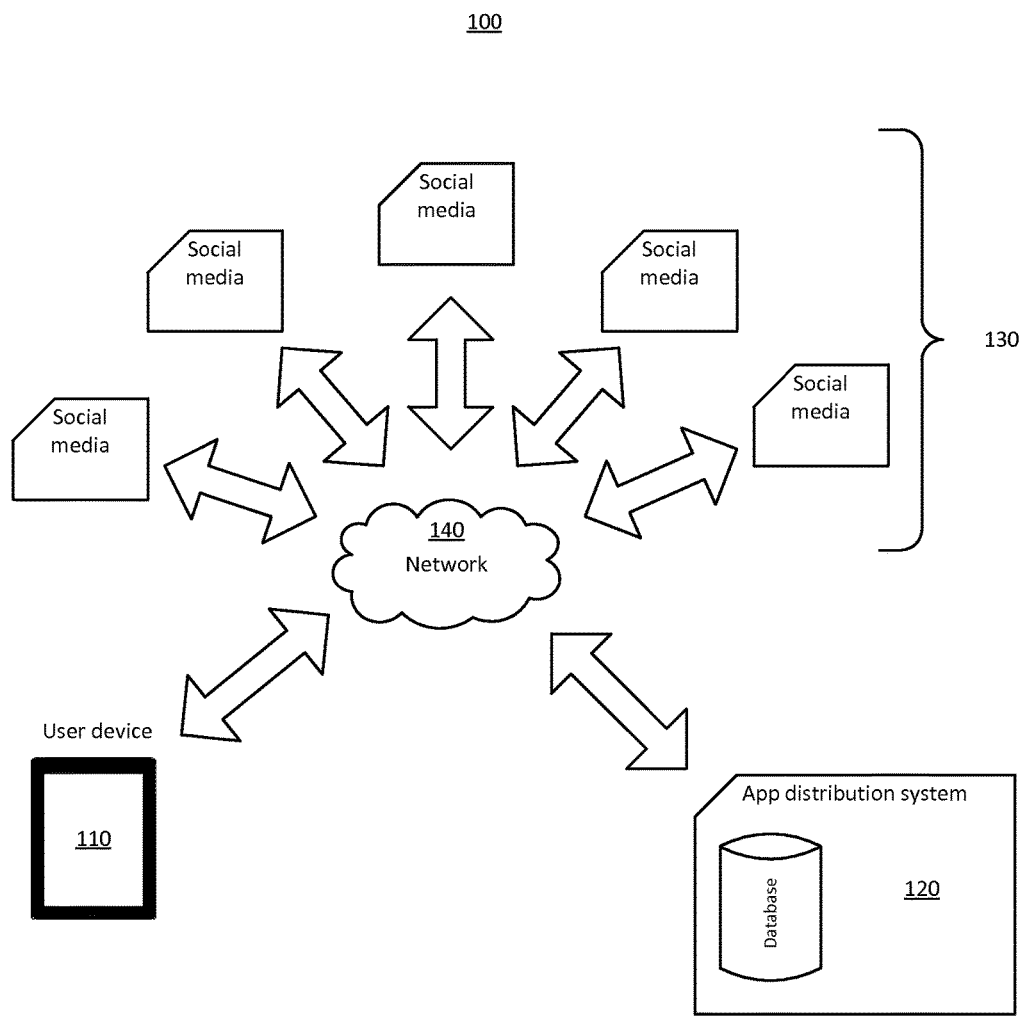
FIG. 1 shows a system relationship according to an implementation of the disclosed subject matter.

The subject matter of this disclosure may be embodied in system components having various relationships. For example, FIG. 1 shows a system relationship 100 that may include a user device 110, such as a smart phone or tablet computer, and an application distribution system 120, such as an online application marketplace. The application distribution system may include servers, storage components, databases, communication components, and processors. The system may manage user accounts and process transactions. The system may distribute applications, over a network, such as over the internet, and may also distribute other types of content such as books, movies and other video content, games, music, and other software for mobile or non-mobile devices and platforms. Applications may include apps, such as mobile apps, and apps may include applications, such as mobile applications.

The techniques described in this disclosure may be applied to applications or any other content mentioned in this disclosure as well as other suitable content not described herein. Applications and other content may be stored in one or more databases on servers included in the system or in communication with servers and databases in proximity to or remote from the system.

The user device may be connected to the application distribution system and to social media sources 130 over a network or system of interconnected networks 140, such as the internet. The social media sources may be any source accessible over a network, such as a social network, a social network service, a message board, a website comment community, a messaging service, a peer-to-peer ad hoc messaging network, a video sharing website, or a website or blog that posts written, audio, or video articles, comments, or reviews about applications or other content.

Figure 2:
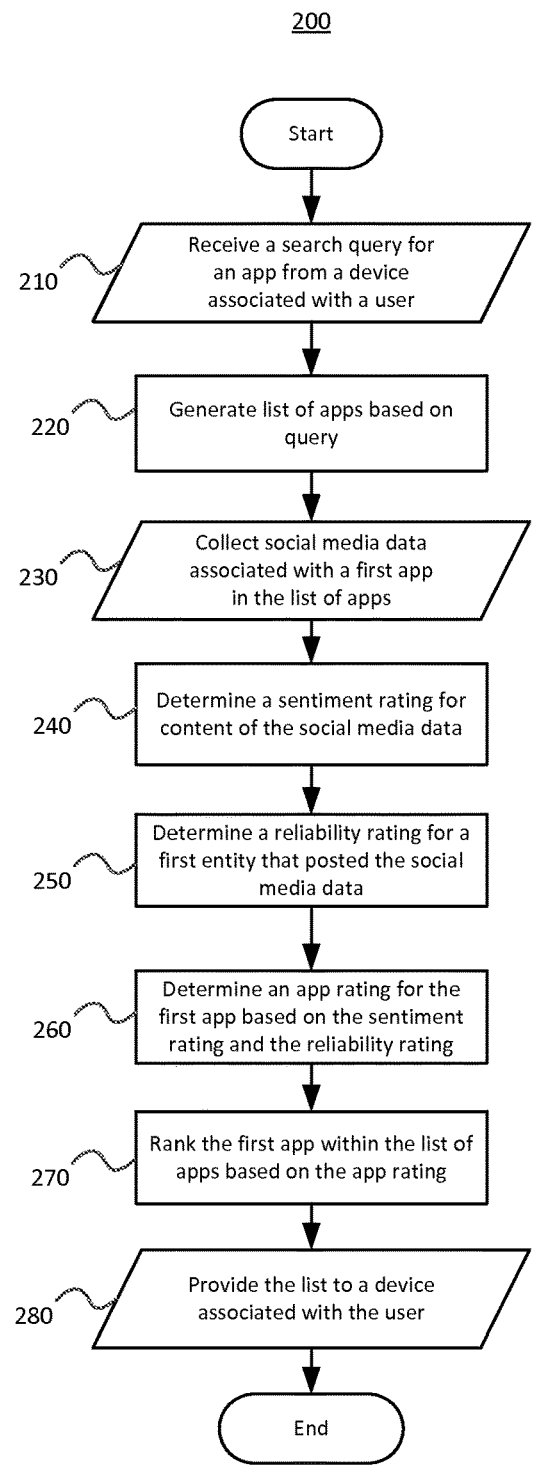
FIG. 2 shows a method according to an implementation of the disclosed subject matter.

Techniques disclosed herein may be employed to provide relevant application search results based on a reliability rating. For example, FIG. 2 shows a method 200 depicting an implementation of the disclosed subject matter. A user may issue a search query on a device associated with the user, such as a smart phone. The search query may include search terms. The device may send the search query to an application distribution system. At 210 the application distribution system may receive the search query from the device associated with the user. At 220, the system may generate indicators of a plurality of applications based on the search query, such as a list of applications. For example, the application distribution system may determine one or more applications that are associated with the received search terms based on a word matching technique. A word matching technique generally refers to any suitable string matching algorithm or approximate string matching algorithm (a.k.a. fuzzy string matching). Examples of string matching algorithms that may be employed to determine an application that matches one or more of the search terms include the Knuth-Morris-Pratt algorithm, the Boyer-Moore string search algorithm, the Apostolico-Giancarlo algorithm Rabin-Karp algorithm, and the Aho-Corasick string matching algorithm.

Word terms may be associated with an application or other digital content based on, for example, a list of keywords provided by a developer or publisher. Alternatively or in addition, the keywords may be determined by a distributor of the content, such as an application marketplace or similar system. The word searching technique may compare the received search terms to other textual data associated with the digital content such as a title, a summary or description, a cast, etc. An exact match of a search term to text associated with the digital content is not required. For example, if a user misspells a word in a search term or the digital content misspells a word, the word matching technique may identify the digital content as a "match" even though the match is not exact. The word search technique may, therefore, identify one or more candidate applications (or other content) that "matches" the one or more search terms received, and an indicator associated with each application may be combined into a list of the applications resulting from the search query.

Generally, in addition to other data and prior to performing further analysis, the application distribution system may collect social media data that includes content of social media posts, a quantity of social media posts, and a quantity of social media relationships of an entity that provided social media posts. For example, at 230 the system may collect social media data associated with a first application in the list of applications. The application distribution system may interact with an application programming interface (API) provided by social media sources to obtain social media data about members of the social media source. The system may also employ an application or script, such as a "web scraper," that simulates a person viewing a web page in a browser. The web scraper may extract social media data from the language in which the web page is written, such as Hypertext Markup Language (HTML) or Wireless Markup Language (WML). In addition, the system may also operate a social media source and access the source's social media data directly.

Social media data may include the content of any post on a social media source as well as the identifier of the poster. Social media data may also include the quantity of relationships of the poster. For example the social media relationships of the entity may include members of a social networking service who follow character-limited posts of the entity. A post may be any comment, article, review, video, or other content that is provided or published by an entity such as a person, association, or company, and that may be accessible on a social media source. For example, social media data may include a post that is an article on a website provided by an entity that is a content reviewer. A social media post may also include a character-limited post to a social networking service by an entity Social media data associated with an application may be any social media data associated with content that references or depicts the application or expresses an opinion related to the application. For example, social media data associated with the application may be an article on a person's blog reviewing the merits of the application, comments on a page of a news website that discuss the application, video content such as a video review of the application on a video-sharing website, a podcast review or discussion of the application, an image of a character of the application depicted in a disparaging way and posted to a member's "wall" on a social network, or a "favorited," "liked," or otherwise-indicated approval, enjoyment, or the like of a post on a social media service that references the release of the application.

Social media data may indicate an interaction level of an entity with one or more social media sources. For example, social media data may take the form of an entity's social graph. A social graph generally refers to an arrangement of data that represents the interconnection of relationships of a member of a social network. Social media data may include the quantity of relationships a member has with other members on a social network, the degrees of separation between a member's relationships, the type of relationships of a member, such as whether members are friends, acquaintances, colleagues, family, and so forth.

Social media data may also include a quantity of actions performed by a member of a social network to post content. For example, a member may post content, such as by posting a link to the first application to the member's social media account online, recommending the content on the social network, sending the link to another member in a message, or posting the link to another member's account along with an indicator of the posting member. A number of posts about a first application may be added to one or more posts about one or more second applications in order to indicate a quantity of posts by an entity about applications. These actions may be totaled into a quantity of actions performed by a member.

Social media data may also include the quantity of times a member of a social network has accessed the content of a posting member, the type of access of that member, such as whether the member merely clicked the link or whether the member downloaded the content and interacted with it, or a quantity representing how frequently a member accesses the posting member's posts versus how many total posts of content the posting member has provided. The social media data may also include the number of times a member re-posted content first accessed by that member from a link provided by the posting member.

A sentiment rating may be employed to determine whether an application mentioned or otherwise associated with a post on a social network is viewed favorably, in which case implementations disclosed herein may consider the application more relevant within a list of search results. For the sake of simplicity, the examples set forth throughout this disclosure may consider a single post by a single entity; however multiple, and indeed many posts in the aggregate may be analyzed in a similar manner and be combined into one or more types of rankings. For example, all posts from a certain user, a type or group of users, users within a certain demographic or location, or other defining characteristic may be analyzed as disclosed herein. More generally, any selected or defined number and/or grouping of posts or users may be used.

At 240, the application distribution system may determine a sentiment rating for content of each of one or more social media posts associated with an application in the list of applications. The system may employ techniques such as sentiment analysis in order to determine the attitude of a speaker of the content or the overall polarity of the content, such as whether the speaker is positively or negatively inclined toward an aspect of the content. For example the system may employ natural language processing, text analysis, computational linguistics, and/or machine learning techniques. The system may categorize text into affect categories based on the presence of certain words known to carry a certain affect, such as "bored" or "happy." Other less definitive words may be assigned a probable affinity to a particular emotion based on other empirically derived word sets. Machine learning methods such as latent semantic analysis, linear regression, naïve Bayes analysis, neural networks, logistic regression, or optimized logistic regression may be employed to determine the sentiment of the content. Other techniques may include holder and target extraction, syntactical techniques, and concept driven techniques and may also be employed in implementations of this disclosure. Sentiment analysis may be conducted on various forms of content, such as text, audio, speech, and video content.

As a result of the sentiment analysis, a sentiment rating may be assigned to the content of a post. For example, if the polarity of the content was analyzed, then the rating may be positive (+1), if the sentiment was favorable towards the application, or negative (−1) if the content was disfavorable to the application, or neutral (0) if the polarity was not definitive. A scaling system may also be employed, whereby a post is evaluated, for example, on a scale between −10 and +10. If categorical techniques are employed, then the sentiment rating may be based on the sum of positive and negative words. For example, content of a post may include the words "great," "exciting," "fun," and "pricey." The sentiment analysis technique may attribute a +2 to "great" and "fun," a +1 to "exciting," and a −2 to "pricey," and 0 to the remaining words determined to be in the content. The resulting sentiment rating for the content may then be determined to be:

$$+2+2+1-2=+3$$

Other techniques may assign values based on the sentiment of concepts, syntactical relationships, and other known methods for sentiment analysis. It should be recognized that a range of suitable bases, normalization techniques, or other methods may be employed when determining ratings suitable for the purposes of this disclosure.

As mentioned above, in some cases it may be possible for one or more users to manipulate sentiment data, such as by posting large numbers of favorable reviews of an application using automated social media accounts. Thus, some implementations disclosed herein may account for this by determining a reliability rating for the entity that provided a post. The higher the reliability rating, the more that entity's posts may be weighted when ranking the application.

Multiple techniques may be employed to determine a reliability rating. For example, at 240, the application distribution system may determine a reliability rating for an entity that provided a social media post based on a quantity of social media posts by the entity and a quantity of the entity's social media relationships. Generally a social media account that posts a relatively high number of posts associated with an application may not be a reliable source. This may be because, for example, the posting entity is an automated account on a social networking site that has been programmed to repeatedly post content about a particular application. Determining the reliability rating for an entity may be further based on a sum of the quantity of social media posts about a first application and a quantity of social media posts about one or more different applications. This sum may be indicative of reliability in circumstances such as when an entity has only posted a few comments about a particular application but has posted a large number of comments about other applications by the same developer. Thus, determining the reliability rating of an entity may include comparing a quantity of social media posts by the entity about a particular application, about applications in general, or about any other content to a threshold value. The threshold value may represent a significant increase from the typical posting quantity. For example the threshold value may be a quantity equal to the 95th percentile of all posters on a social network.

A social media account that does not have relatively many relationships on the social network to which it belongs may also be an indicator of unreliability. This may be because the account is an automated account programmed to simply post content related to applications, but not otherwise engage with members of the social network. In these circumstances, the account may not have very many relationships on the social network due to the lack of interaction with other members. The quantity of relationships for the entity may be compared to a threshold value, which has been predetermined to be representative of the lower bound of the number of live relationships for live accounts.

A reliability rating for an entity may be determined by comparing the quantity of relationships of the entity to the quantity of posts of the entity. The resulting ratio may be used as a basis for determining whether a posting entity is reliable. For example, a threshold ratio may be determined to be 1:25. An entity may have 30 relationships on a social network, but 1500 posts, which would result in a ratio of 1:50, well below the threshold. If it is determined that a threshold value has not been met, then the system may assign a value to the reliability rating. For example, all posts determined to be reliable may be valued at 1 and all posts determined to be unreliable may be determined to be 0. In another example, a reliability value may be based on the quantity of the posts and quantity of the relationships. For example, the ratio of relationships to posts may be used and factored into an overall application rating. In this example, the ratio would be:

$$\frac{1}{50} = 0.02$$

Other techniques may include comparing a quantity to a predetermined average quantity for the social network. In such implementations, the system may determine a first quotient of the quantity of relationships and a predetermined average quantity of relationships, and a second quotient of the quantity of posts and a predetermined average quantity of posts. The quotient of the first quotient and the second quotient may be determined to be the reliability rating of the entity. For example, the average number of relationships may be 100 and the average number of posts may be 300. In such an example the first quotient may be 30/100=0.3 and the second quotient may be 1500/300=5.0. Thus the reliability rating may be:

$$\frac{0.3}{5.0} = 0.06$$

Alternatively or in addition, in some implementations other techniques such as machine learning techniques may be employed to analyze the internal consistency of the content of a post in order to detect abnormalities such as nongrammatical statements or usage choices. Similarly, a post by a first entity about an application may be compared to one or more other posts by the first entity or by one or more other entities about the application. Grammar, usage, or other factors may be analyzed about the posts in order to determine whether there is abnormal uniformity or systematic errors across the posts. Abnormal uniformity may be an indicator of unreliability because such posts would be expected to be independent events rather than coordinated by a single entity. Any or all of these factors may serve or contribute to the reliability rating of an entity. These factors may be quantified and implemented in a manner similar to that discussed throughout the disclosure with respect to the reliability rating. Thus, an application distribution system may determine the reliability rating for an entity based on the content of the entity's social media posts, or an application distribution system may determine the reliability rating for an entity based on comparing the content of a first post by the entity to the content of a second post by the entity. An application distribution system may also determine the reliability rating for an entity based on comparing the content of a social media post by an entity that is associated with a first application to the content of a social media post by a different entity that is also associated with the first application.

As previously indicated, implementations of this disclosure may determine an application rating for an application. For example, at 260, the application distribution system may determine an application rating for an application based on the sentiment rating and the reliability rating. Content in a post on a social network may be analyzed using sentiment analysis techniques, and it may be determined that the content has an overall positive sentiment rating of +3. However, social media data about the entity that posted the content may be analyzed and the application distribution system may determine the entity has a reliability rating of 1/50 as a result of a ratio of 30 relationships to 1500 posts. The application rating may be the product of the sentiment rating and the reliability rating, and thus the application rating may be:

[+3]*[0.02]=0.06

Once an application rating is determined, the application distribution system may rank the application within an ordered list of the search results based on the application rating. For example, at 270, the application may be named "Warlock Empire" and may have an application rating of 0.06. Applications named "Bowmaster XLV" and "Endeavor Forever" may have application ratings of 2.2 and 0.07 respectively, and "Stone Cutter's Quest" and "Undertaken & Forsaken" may have application ratings of −0.05 and −1.2 respectively. Thus the ranked list of applications may appear, as discussed previously:

| Rank: | Application indicator: | Application rating: |
|---|---|---|
| 1 | Bowmaster XLV | 2.2 |
| 2 | Endeavor Forever | 0.07 |
| 3 | Warlock Empire | 0.06 |
| 4 | Stone Cutter's Quest | −0.05 |
| 5 | Undertaken & Forsaken | −1.2 |

At 280 the ordered list of indicators of the applications may be provided over a network to the device associated with the user, such as her smart phone.

Figures 3, 4:
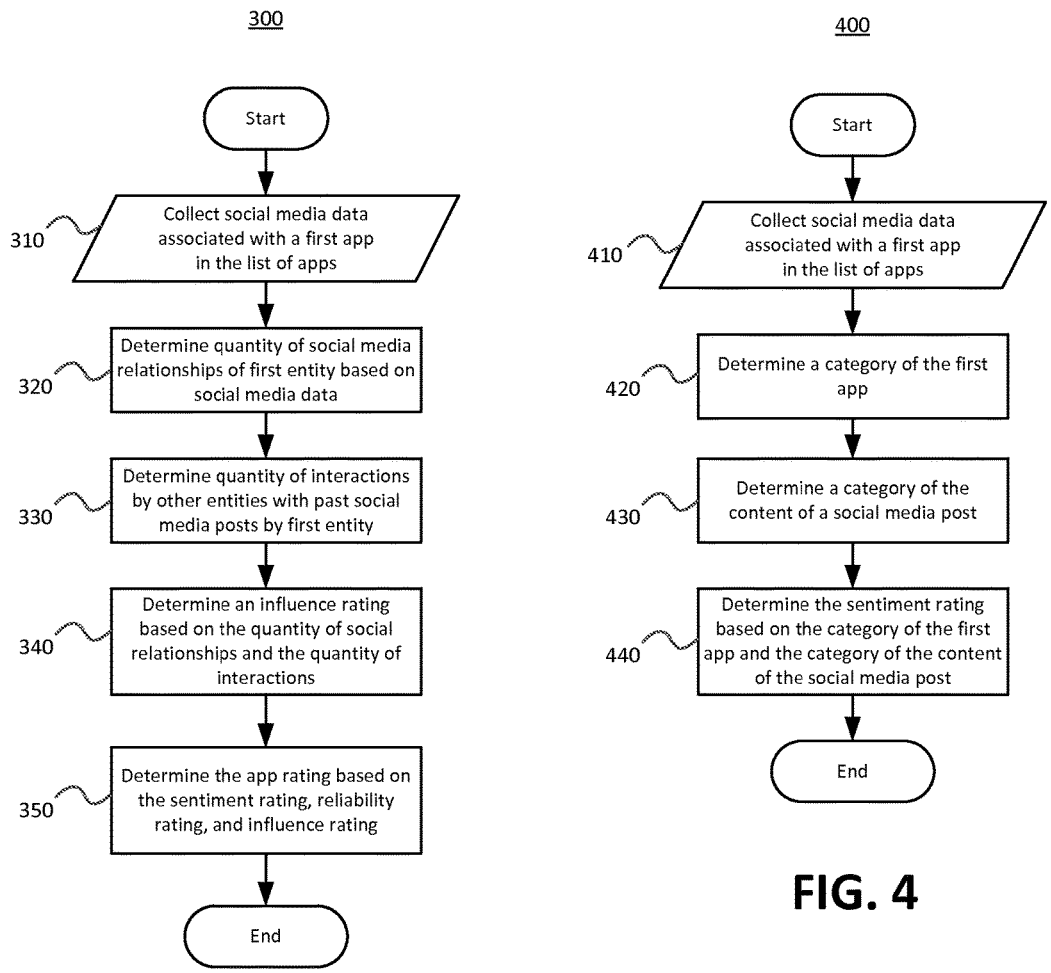
FIG. 3 shows a method according to an implementation of the disclosed subject matter.
FIG. 4 shows a method according to an implementation of the disclosed subject matter.

Additional factors may be included in the determination of the application rating. For example, FIG. 3 shows, in an implementation, a method 300 for determining an application rating based on a sentiment rating, a reliability rating, and an influence rating. The influence rating may be based on collected social media data. At 310, the application distribution system may collect social media data associated with an application included in the list of applications that were search results of a user's query. At 320, the system may determine a quantity of social network relationships of an entity that posted the social media data. At 330, the system may determine a quantity of interactions by other entities with past social media posts by the posting entity. At 340, the system may determine an influence rating for the posting entity based on the quantity of relationships of the posting entity and the quantity of interactions by other entities with social media posts by the posting entity. At 350, an application rating may be determined based on a sentiment rating, a reliability rating, and the influence rating.

In one example, the influence rating may be a rating known, referred to, or derived from a "k-factor." A k-factor may be based on the product of a conversion percentage, which is the percentage of times an entity's posts on a social network are accessed by other members of the social network, and the total number of posts by that entity. If an entity posts content with all of the entity's relationships, then the entity's k-factor may be the product of the entity's conversion percentage and the total number of the entity's relationships. Conversion percentages may be based on different types of access. For example, a conversion percentage may be based on following a link posted by an entity, downloading content from the link, or interacting with the content downloaded from the link.

Machine learning techniques may be implemented to determine influence ratings for entities and otherwise determine the expected value of an entity's posts. Suitable machine learning techniques may include linear regression, naïve Bayes, neural networks, logistic regression, and optimized logistic regression. Machine learning techniques may analyze social media data such as the number of relationships an entity has on social media, the number of posts the entity has previously performed, the number of posts the entity's social media relationships have performed, the number of relationships of the entity's social media relationships, and other social media data discussed herein, including k-factors. Based on this analysis, machine learning techniques may determine an influence rating for an entity, such as their expected value.

In an example, an application rating may be calculated from a sentiment rating, a reliability rating, and an influence rating as product of these factors. For example, the sentiment rating may be determine to be +3 and the reliability rating may be determined to be 0.02. If the entity had 30 relationships but posted 1500 times, there may be 45000 total historical opportunities for interactions with the entity's posts. However, the entity may have several very dedicated followers on the social network. If relationships on the social network had interacted with the entity's posts 2250 times, then the conversion percentage for the entity may be 2250/45000=0.05. Thus, the entity's influence rating may be determined to be:

$$[0.05]*[30]=[1.5]$$

This influence rating may then be incorporated into other values factoring into the application rating, in a manner such as that already discussed. Thus the resulting application rating for the application may be:

$$[+3]*[0.02]*[1.5]=[0.09]$$

Based on the application rating, the prior application rankings may change due to the inclusion of the influence factor. For example, the ranked list previously shown may now be ordered as follows:

| Rank: | Application indicator: | Application rating: |
|---|---|---|
| 1 | Bowmaster XLV | 2.2 |
| 2 | Warlock Empire | 0.09 |
| 3 | Endeavor Forever | 0.07 |
| 4 | Stone Cutter's Quest | −0.05 |
| 5 | Undertaken & Forsaken | −1.2 |

In another implementation, the sentiment rating may be adjusted by analyzing the categories of content associated with an application and a post that may include a discussion of the application. For example, FIG. 4 shows, in an implementation, a method 400 for determining a sentiment rating based on a category of an application and the category associated with the content of a post about the application. At 410, an application distribution system may collect social media data associated with an application. The system may determine a category associated with the application at 420 and a category associated with the content of posts associated with the application at 430. An application distribution system may then determine a sentiment rating for an entity based on the category of the application and the category of the content of the posts associated with the application.

Categories may be determined by employing any of the machine learning techniques described herein to analyze content posted about an application. For example, a sentiment rating may be determined based on a comparison of a category of an application to a category of a social media post about the application. The application may contain a summary or description about its operation and contents, which includes the words "first person," "character," "spell," and "worlds." Terms included in the initial user query may also be analyzed to determine categories associated with the application. The machine learning techniques may strongly associate these terms with the category "role-playing game" and thus categorize it as such. The post may mention the game by name, however it may not discuss the merits of the game but rather the merits of the "freemium" gameplay model it employs. For example, the post may include a statement such as "Warlock Empire is a mediocre game, where users have access to an exceptional amount of game play before the freemium requirements kick-in." In this circumstance, the system may have strong associations between the term "freemium" and the category of games known as "freemium games." Thus the system may categorize the post as a post about freemium games, whereas the game is categorized as a role-playing game.

Categories may influence the sentiment rating depending on, for example, the search terms that are used to identify the initial list of potential applications. In the above example, sentiment analysis may determine that the post contains a strong positive polarity to the concept of freemium, but a neutral polarity to the concept of the game itself. If the user included the term "freemium" in the initial search query, then the sentiment expressed in the post may be heavily weighted. On the other hand, if the user included the term "Warlock Empire" in the query, then the post may not be heavily weighted with respect to the sentiment rating because the sentiment expressed may be determined to be directed at the freemium aspects of the game and not the game in general.

For example, in an implementation, the sentiment expressed in the post may be determined to be consistent with that discussed above and carry a value of +3. The search terms may have only included the terms "Warlock Empire" and no other content associated with the application may contain the term "freemium" or related terms. Thus the category associated with the application may be determined to be a "role-playing game," as described above, and the category determined to be associated with the post may be "freemium." Because the categories of the post are different and unrelated to the categories of the application, the sentiment rating may be weighted with the term of, for example, "0." Thus at 440, the overall sentiment rating for the post may be determined to be +3*0=0. Other factors, quantities, and calculations suitable for the purposes of this disclosure may be employed to weight or otherwise calibrate the sentiment rating.

Figure 5:
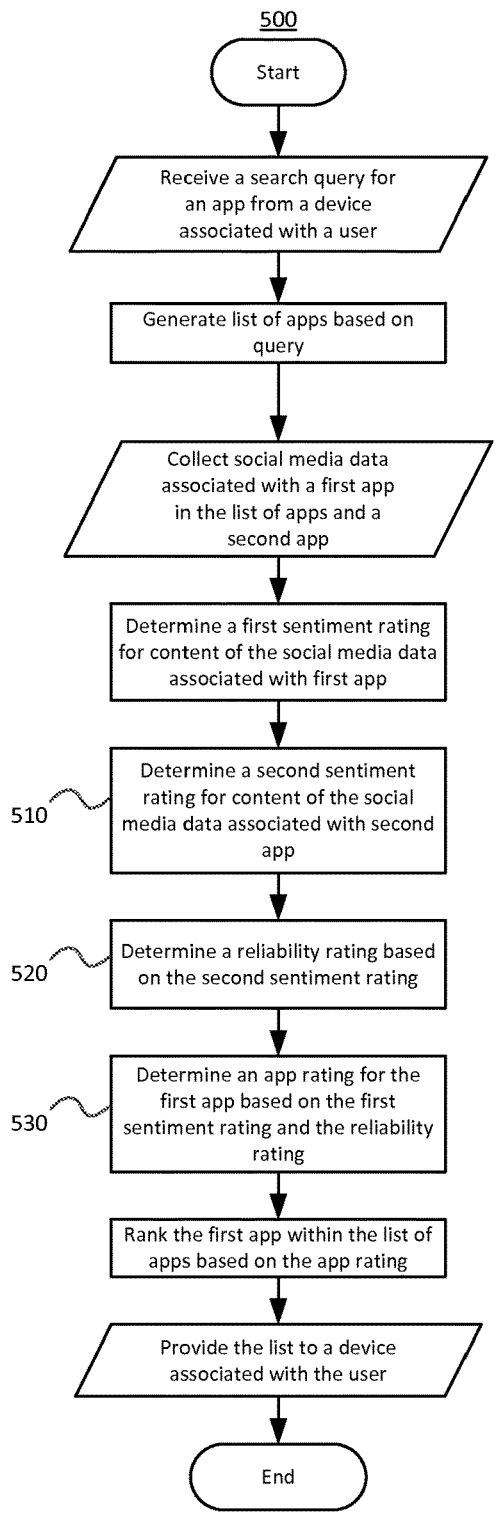
FIG. 5 shows a method according to an implementation of the disclosed subject matter.

A reliability rating as discussed herein may also be determined by analyzing the past sentiment ratings attributed to posts by an entity as well as the success of an application associated with past posts of the entity. For example, FIG. 5 shows, in an implementation, a method 500, for determining a reliability rating based on a second sentiment rating. At 510, the system may determine a second sentiment rating for a content of a second social media post that was provided by the first entity and that is associated with a second application different from the first application. At 520, a reliability rating may be determined based on the second sentiment rating.

For example, employing sentiment analysis techniques, an entity's past posts related to applications may be analyzed to determine a historical sentiment profile of the entity. This analysis may be a determination of an average sentiment rating or a categorical analysis. The sentiment rating determined for the entity's pasts posts may serve as a basis for the reliability rating of the entity. For example, it may be determined that for posts about applications categorized as role-playing games, the historical sentiment rating averages to −1.4, but for applications categorized as puzzle games, the historical sentiment rating averages to +0.4. Thus, if the application is categorized as a role playing game, the reliability rating may be determined to be the difference between a neutral sentiment rating and the historical sentiment rating. For example, the reliability rating may be determined to be 0−(−1.4)=1.4. The application distribution system may determine an application rating for the application based on the first sentiment rating and the reliability rating at 530. For example, the system may determine the application rating based on adding the sentiment rating to the reliability rating, resulting in an application rating of:

$$[\text{Sentiment rating}]+[\text{Reliability rating}]=[\text{Application rating}]$$

$$[+3]+[1.4]=[4.4]$$

In implementations that factor in the influence rating, the application rating may be determined, for example, based on multiplying the sum of the sentiment rating and reliability by the influence rating.

Figure 6:
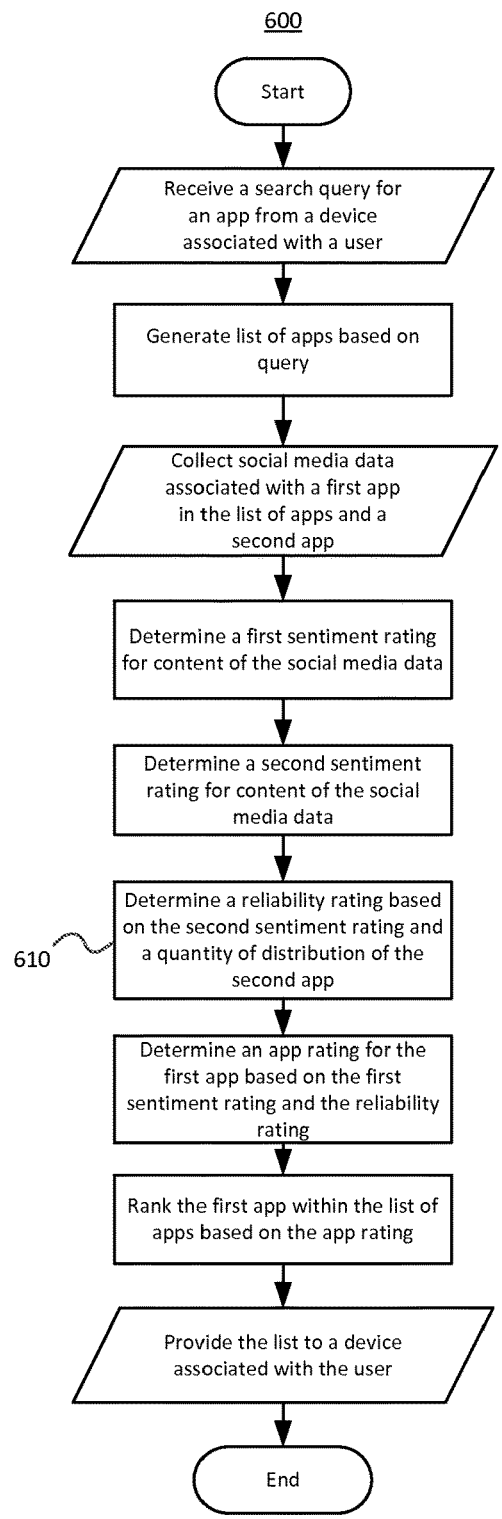
FIG. 6 shows a method according to an implementation of the disclosed subject matter.

In another implementation, determining a reliability rating for an entity may be based on a quantity of distribution of a prior application that occurred when the entity posted content about the prior application on a social network. For example, FIG. 6 shows, in an implementation, a method 600, where, at 610, the application distribution system determines a reliability rating based on a sentiment rating of a second application and the quantity of distribution of the second application. A first application that was included in the set of applications returned in a user's search result may have content posted about it by an entity that had also previously posted content about other applications, such as a second application. The content distribution system may analyze the past sentiment ratings for content expressed by the entity about the second application. For example, the system may compare the past sentiment ratings to the quantity of distribution of the second application. The quantity of distribution may be by the application distribution system and/or other distribution systems. The system may correlate the positive sentiments expressed by the entity about the second application to increased distribution of the second application or negative sentiments expressed by the entity to decreased distribution.

A degree of correlation may be quantified by any known techniques, such as by dividing the covariance of two variables by the product of their standard deviations. This degree of correlation may be or serve as the basis for the reliability rating for the entity. The reliability rating may then be combined with other factors to determine the overall application rating. For example, where a perfect correlation is be defined as +1 and perfect inverse correlation defined as −1, the reliability rating may be multiplied by the sentiment rating and the influence rating in order to get an overall application rating.

Figure 7:
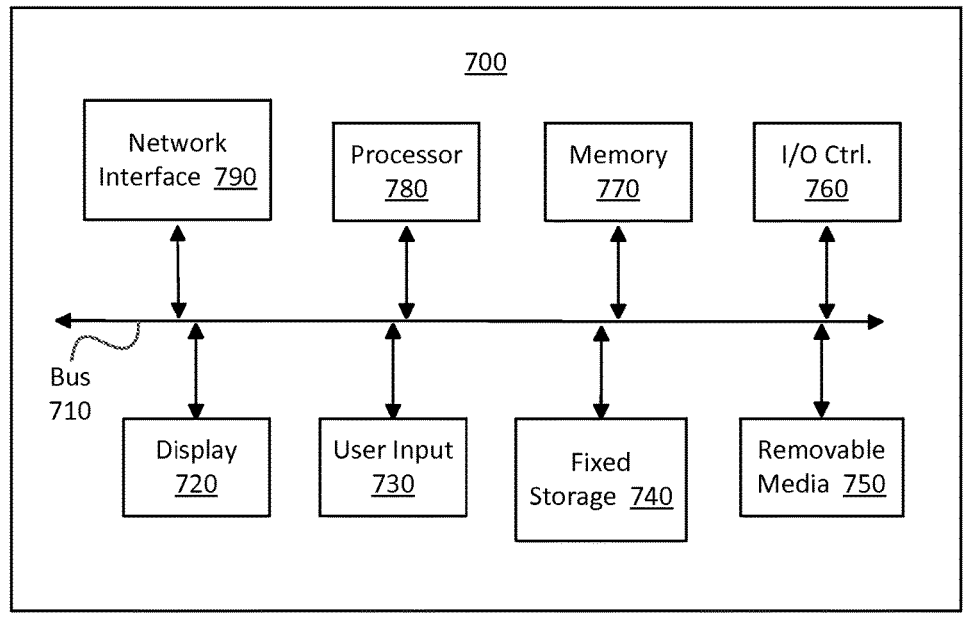
FIG. 7 shows a computing device according to an implementation of the disclosed subject matter.

Implementations of the disclosed subject matter may be implemented in and used with a variety of component and network architectures. FIG. 7 is an example computer 700 suitable for implementations of the presently disclosed subject matter. The computer 700 includes a bus 710 which interconnects major components of the computer 700, such as a central processor 780, a memory 770 (typically RAM, but which may also include ROM, flash RAM, or the like), an input/output controller 760, a user display 720, such as a display screen via a display adapter, a user input interface 730, which may include one or more controllers and associated user input devices such as a keyboard, mouse, and the like, and may be closely coupled to the I/O controller 760, fixed storage 740, such as a hard drive, flash storage, Fibre Channel network, SAN device, SCSI device, and the like, and a removable media component 750 operative to control and receive an optical disk, flash drive, and the like.

The bus 710 allows data communication between the central processor 780 and the memory 770, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 700 are generally stored on and accessed via a computer readable medium, such as a hard disk drive (e.g., fixed storage 740), an optical drive, floppy disk, or other storage medium.

The fixed storage 730 may be integral with the computer 700 or may be separate and accessed through other interfaces. A network interface 790 may provide a direct connection to a remote server via a telephone link, to the Internet via an internet service provider (ISP), or a direct connection to a remote server via a direct network link to the Internet via a POP (point of presence) or other technique. The network interface 790 may provide such connection using wireless techniques, including digital cellular telephone connection, Cellular Digital Packet Data (CDPD) connection, digital satellite data connection or the like. For example, the network interface 790 may allow the computer to communicate with other computers via one or more local, wide-area, or other networks, as shown in FIG. 8.

Many other devices or components (not shown) may be connected in a similar manner (e.g., document scanners, digital cameras and so on). Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 770, fixed storage 740, removable media 750, or on a remote storage location.

Figure 8:
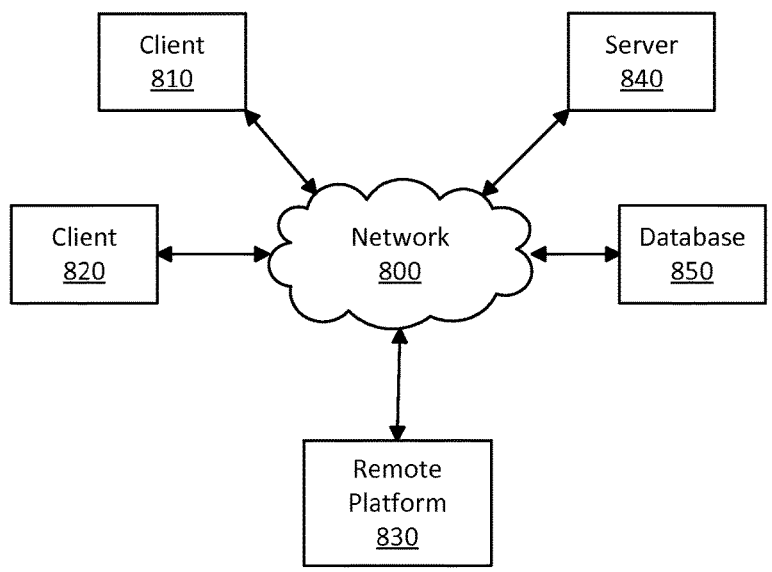
FIG. 8 shows a network configuration according to an implementation of the disclosed subject matter.

FIG. 8 shows an example network arrangement according to an implementation of the disclosed subject matter. One or more clients 810, 820, such as local computers, smart phones, tablet computing devices, and the like may connect to other devices via one or more networks 800. The network may be a local network, wide-area network, the Internet, or any other suitable communication network or networks, and may be implemented on any suitable platform including wired and/or wireless networks. The clients may communicate with one or more servers 840 and/or databases 850. The devices may be directly accessible by the clients 810, 820, or one or more other devices may provide intermediary access such as where a server 840 provides access to resources stored in a database 850. The clients 810, 820 also may access remote platforms 830 or services provided by remote platforms 830 such as cloud computing arrangements and services. The remote platform 830 may include one or more servers 840 and/or databases 850.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's game score, a user's work product, a user's provided input, a user's geographic location, and any other similar data associated with a user), or to control whether and/or how to receive shared content from a content distribution system, game developer, or social network member that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with social network information may be generalized where location information is obtained (such as to a city, ZIP code, or state level), so that a particular location of a user cannot be determined. Thus, the user may have control over how information is collected about the user and used by content distribution systems, social network systems, or content developers.

In implementations of this disclosure, certain data may be treated in one or more ways before it is stored or used, so that personally identifiable information is removed. For example, a user's identity may be treated so that no personally identifiable information can be determined for the user, or a user's geographic location associated with social network information may be generalized where location information is obtained (such as to a city, ZIP code, or state level), so that a particular location of a user cannot be determined. Thus, the user may have control over how information is collected about the user and used by content distribution systems, social network systems, or content developers.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
receiving, by an application distribution system, a search query from a device associated with a user, the search query including one or more search terms;
generating, by the application distribution system, indicators of a plurality of applications by at least executing a search based on the search query, wherein each of the plurality of applications is associated with at least one of the one or more search terms;
determining, by the application distribution system, a respective sentiment rating for a content of each of one or more social media posts associated with an application from the plurality of applications, wherein each of the respective sentiment ratings is indicative of whether the content of a corresponding one of the one or more social media posts was positive, negative, or neutral towards the first application;
determining, by the application distribution system, a reliability rating for an entity that provided the one or more social media posts, the reliability rating indicative of whether the entity is informed about the application, the reliability rating based on:
  a quantity of the one or more social media posts, and
  a quantity of social media relationships of the entity;
determining, by the application distribution system, an application rating for the application based on the respective sentiment ratings and the reliability rating;
determining, by the application distribution system and based on the application rating, a position for the application within a list of the plurality of applications, wherein the list of the plurality of applications is ordered based on respective application rankings for each application from the plurality of applications; and
sending, from the application distribution system over a network, via a network interface of the application distribution system, and to the device associated with the user, the list of the plurality of applications.

2. The method of claim 1, further comprising collecting social media data prior to the determining the respective sentiment ratings or the determining the reliability rating, wherein the social media data comprises:
the content of each of the one or more social media posts;
the quantity of the one or more social media posts; and
the quantity of the social media relationships of the entity.

3. The method of claim 1, wherein the determining the reliability rating for the entity is further based on a sum of the quantity of the one or more social media posts and a quantity of second social media posts that were provided by the entity and that are associated with at least one application other than the first application.

4. The method of claim 1, wherein the determining the reliability rating for the entity is further based on the content of each of the one or more social media posts.

5. The method of claim 1, wherein the determining the reliability rating for the entity is further based on comparing a first content of the one or more social media posts to a second content of the one or more social media posts.

6. The method of claim 1, wherein the determining the reliability rating for the entity is further based on the content of each of the one or more social media posts and a content of each of one or more other social media posts provided by a second entity and that are associated with the first application.

7. The method of claim 1, wherein the determining the reliability rating for the entity is further based on comparing the content of each of the one or more social media posts to a content of each of a one or more other social media posts provided by a second entity and that are associated with the first application.

8. The method of claim 1, wherein at least one of the one or more social media posts comprises an article on a website and the entity comprises a content reviewer.

9. The method of claim 1, wherein at least one of the one or more social media posts comprises a character-limited post to a social networking service and the social media relationships of the entity comprise members of the social networking service who follow character-limited posts of the entity.

10. The method of claim 1, further comprising:
determining an influence rating for the entity based the quantity of social media relationships of the entity and a quantity of interactions by other entities with a second social media post that was provided by the entity; and
wherein the determining the application rating for the entity is further based on the influence rating.

11. The method of claim 1, further comprising:
determining a category of the first application; and
determining a category of the content of each of the one or more social media posts;
wherein the determining the respective sentiment ratings is further based on the category of the first application and the category of the content of each of the one or more social media posts.

12. The method of claim 1, wherein the content of at least one of the one or more social media posts comprises video content.

13. The method of claim 1, wherein the determining the reliability rating of the entity comprises comparing the quantity of the social relationships of the entity to the quantity of the one or more social media posts.

14. The method of claim 1, wherein the determining the reliability rating of the entity comprises comparing the quantity of the one or more social media posts to a threshold value.

15. A method comprising:
receiving, la an application distribution system, a search query from a device associated with a user, the search query including one or more search terms;
generating, by the application distribution system, indicators of a plurality of applications by at least executing a search based on the search query, wherein each of the plurality of applications is associated with at least one of the one or more search terms;
determining, by the application distribution system, a first sentiment rating for a content of a first social media post that was provided by entity entity and that is associated with a first application of the plurality of applications;
determining, by the application distribution system, a second sentiment rating for a content of a second social media post that was provided by the entity and that is associated with a second application different from the first application;
determining, by the application distribution system and based on the second sentiment rating, a reliability rating for the entity, the reliability rating indicative of whether the entity is informed about the second application;

determining, by the application distribution system and based on the first sentiment rating and the reliability rating, an application rating for the first application;

determining, by the application distribution system and based on the application rating, a position for the application within a list of the plurality of applications, wherein the list of the plurality of applications is ordered based on respective application rankings for each application from the plurality of applications; and sending, from the application distribution system over a network, via a network interface of the application distribution system, and to the device associated with the user, the list of the plurality of applications.

16. The method of claim 15, wherein the determining the reliability rating for the entity is further based on a quantity of distribution of the second application.

17. The method of claim 15, wherein the determining the reliability rating for the entity is further based on comparing the second sentiment rating to a quantity of distributions of the second application.

18. A method comprising:

receiving, la an application distribution system, a search query from a device associated with a user, the search query including one or more search terms;

generating, by the application distribution system, indicators of a plurality of applications by at least executing a search based on the search query, wherein each of the plurality of applications is associated with at least one of the one or more search terms;

determining, by the application distribution system, a first sentiment rating for a content of a first social media post that was provided by a entity and that is associated with a first application of the plurality of applications;

determining, by the application distribution system, a second sentiment rating for a content of a second social media post that was provided by the entity and that is associated with a second application different from the first application;

determining, by the application distribution system, a reliability rating for the entity based on the second sentiment rating and a quantity of distribution of the second application, the reliability rating indicative of whether the entity is informed about the second application;

determining, by the application distribution system, an application rating for the first application based on the first sentiment rating and the reliability rating;

determining, by the application distribution system and based on the application rating, a position for the application within a list of the plurality of applications, wherein the list of the plurality of applications is ordered based on respective application rankings for each application from the plurality of applications; and sending, from the application distribution system over a network, via a network interface of the application distribution system, and to the device associated with the user, the list of the plurality of applications.

19. The method of claim 18, further comprising:

determining an influence rating for the entity based a quantity of social media relationships of the entity and a quantity of interactions by other entities with a second social media post that was provided by the entity;

wherein the determining the application rating is further based on the influence rating.

20. The method of claim 18, further comprising:

determining an influence rating for the entity based a quantity of social media relationships of the entity and a quantity of interactions by other entities with a social media post that was provided by the entity;

wherein the determining the first sentiment rating is based on a comparison of a category of the first application to a category of the first social media post; and wherein the determining the application rating is further based on the influence rating.

* * * * *

UNITED STATES PATENT AND TRADEMARK OFFICE
CERTIFICATE OF CORRECTION

PATENT NO.         : 10,061,817 B1
APPLICATION NO.    : 14/812377
DATED              : August 28, 2018
INVENTOR(S)        : Benjamin Frenkel and Duncan John Curtis Page 1 of 1

It is certified that error appears in the above-identified patent and that said Letters Patent is hereby corrected as shown below:

In the Claims

Column 17, Line 26 (Claim 18): Replace "la an application" with --by an application--

Signed and Sealed this
Sixteenth Day of April, 2019

Andrei Iancu
*Director of the United States Patent and Trademark Office*